United States Patent [19]

Green et al.

[11] 4,108,803

[45] Aug. 22, 1978

[54] PHOTOPOLYMERIZABLE EPOXY RESINS CONTAINING PENDANT UNSATURATED ESTER OR AMIDOMETHYL GROUPS

[75] Inventors: George Edward Green, Stapleford; John Sidney Waterhouse, Cherry Hinton, both of England

[73] Assignee: Ciba-Geigy Corporation Ardsley, N.Y.

[21] Appl. No.: 776,446

[22] Filed: Mar. 10, 1977

[30] Foreign Application Priority Data

Mar. 23, 1976 [GB] United Kingdom ............... 11598/76
Jul. 16, 1976 [GB] United Kingdom ............... 29792/76

[51] Int. Cl.² ............................................. C08G 59/16
[52] U.S. Cl. ................................. 96/76 R; 204/159.22; 528/361; 526/273; 528/404; 260/348.47; 548/308; 548/310; 548/318; 528/405; 528/407; 528/289
[58] Field of Search ................... 260/2 EP, 2 EC, 257, 260/260, 78.41, 837 R, 348.47; 526/11.2; 548/307, 310, 318

[56] References Cited

U.S. PATENT DOCUMENTS

| | | | |
|---|---|---|---|
| 3,640,910 | 2/1972 | Porret et al. | 260/2 EP |
| 3,770,602 | 11/1973 | D'Alelio | 204/159.15 |
| 3,808,226 | 4/1974 | Habermeier et al. | 260/309.5 |
| 3,809,660 | 5/1974 | Habermeier et al. | 260/2 EP |
| 3,847,769 | 11/1974 | Garratt et al. | 204/159.22 |
| 3,882,003 | 5/1975 | Mani | 204/159.16 |

FOREIGN PATENT DOCUMENTS

2,300,542 7/1974 Fed. Rep. of Germany.
1,090,142 11/1967 United Kingdom.

*Primary Examiner*—Harold D. Anderson
*Assistant Examiner*—E. A. Nielsen
*Attorney, Agent, or Firm*—Vincent J. Cavalieri

[57] ABSTRACT

The resins are diepoxides of the formula

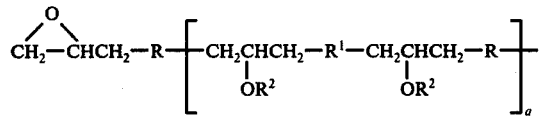

-continued

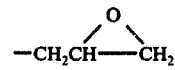

where
$a$ is an integer of average value from 1 to 100,
each R and $R^1$ represents a group

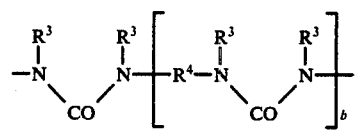

or $-O-(OC)_c-R^5-(CO)_c-O-$,
each $R^2$ represents $-H$ or a group $-(CH_2NH)_d COC(R^6)=CH_2$, at least one of the $2a$ groups $R^2$ representing $-(CH_2NH)_d COC(R^6)=CH_2$,
each $R^3$ denotes a lower alkyl group, or conjointly each pair represents a group of formula $-CH_2CH_2-$, $-C(R^7R^8)CO-$,

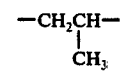

$-CH_2CH_2CH_2-$, $-COCO-$, $-COCOCO-$, or $-COC(OH)_2CO-$,
$R^4$ represents a divalent aliphatic, cycloaliphatic, or araliphatic radical,
$b$, $c$, and $d$ are each zero or 1,
$R^5$ represents a straight or branched chain aliphatic group or, providing $c$ is 1, it may alternatively represent a group

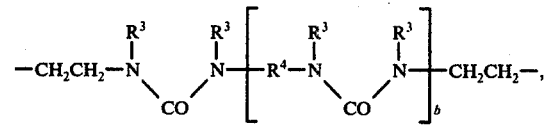

$R^6$ represents $-H$ or a lower alkyl group, and
$R^7$ and $R^8$ each represent $-H$, $-CH_3$, or $-C_2H_5$.

The resins are water-soluble, but, on exposure to actinic radiation polymerize and become insoluble; images of the polymerized resin may therefore be developed with water.

7 Claims, No Drawings

PHOTOPOLYMERIZABLE EPOXY RESINS CONTAINING PENDANT UNSATURATED ESTER OR AMIDOMETHYL GROUPS

BACKGROUND OF THE INVENTION

This invention relates to advanced epoxide resins which polymerise on exposure to actinic radiation, to methods of preparing them and of polymerising such resins by means of actinic radiation, to supports bearing thereon such a resin in the polymerisable state, and to supports bearing thereon a resin polymerised by means of actinic radiation.

Substances capable of becoming polymerised on exposure to actinic radiation are used in, for example, the preparation of printing plates for offset printing and of printed circuits, and for coating metals, such as in the manufacture of cans (see e.g., Kosar, "Light-sensitive Systems: Chemistry and Applications of non silver halide photographic Processes", Wiley, New York, 1965, 473 pp.; Delzenne, "Synthesis and Photocrosslinking of light-sensitive Polymers" in European Polym. J., Suppl., 1969, pp. 55–91; William, "Photopolymerisation and Photocrosslinking of Polymers" in Fortschr. chem. Forsch., Vol. 13 (2), 227–250). There are various drawbacks in the substances presently available which may be polymerised by exposure to actinic radiation. Some are so unstable that they must be applied to substrate only immediately prior to exposing them to actinic radiation. Others are relatively insensitive and need lengthy exposure to actinic radiation in order to become sufficiently polymerised. Others, after being polymerised, are not resistant to etching baths used in subsequent processes.

In most cases the reproduction of an image is desired: a layer of the polymerisable material is exposed to actinic radiation imagewise as through a negative and then "developed" by being washed with a suitable liquid, such as perchloroethylene, methylene chloride, ethylene dichloride, acetone, ethyl methyl ketone, cyclohexanone, n-propanol, ethanol, toluene, benzene, ethyl acetate, and mixtures thereof, to dissolve and remove that portion of the layer which was not polymerised by exposure to actinic radiation.

However, the use of such organic solvents to develop the image is often undesirable, on grounds of their flammability or toxicity, and so the need exists for substances which may be polymerised by means of actinic radiation and then developed by aqueous media.

It has now been found that, by using certain novel advanced epoxide resins, the aforesaid disadvantages of materials previously available for polymerisation by actinic radiation can be at least substantially overcome.

The use of photopolymerisable advanced epoxide resins has previously been described in British Pat. No. 1090142, but the only resins mentioned are derivatives of 2,2-bis(4-hydroxyphenyl)propane. We found such resins to be not water-soluble, and there is no indication in that Specification that, by the use of certain non-aromatic advanced epoxide resins, it is possible to obtain water-developable photopolymerisable products.

Advanced epoxide resins in which the free hydroxyl groups have been treated with unsaturated acid and alcohol derivatives have also been described in West German Offenlegungsschrift No. 2300542. Again, only resins derived from phenols are described, and we have found them not to be water-soluble. The properties of these materials after irradiation are not described.

DETAILED DISCLOSURE

One aspect of this invention accordingly provides epoxide resins which are soluble in water before exposure to actinic radiation but which, on exposure to actinic radiation, polymerise and become insoluble in water, the said resins having the general formula

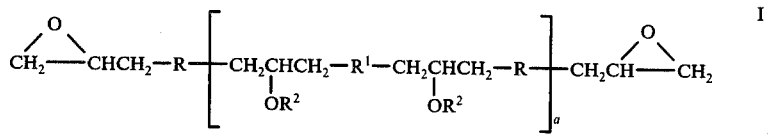

where
$a$ is an integer of average value of at least 1, but preferably not more than 100,
each R and $R^1$ represents a group of formula

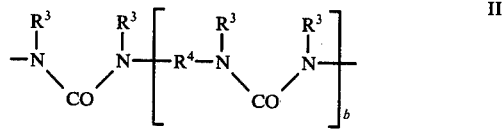

or $-O-(OC)_c-R^5-(CO)_c-O-$, each $R^2$ represents a hydrogen atom or a group of formula $-(CH_2NH)_dCOC(R^6)=CH_2$, with the proviso that at least 1, and preferably at least 25%, of the $2a$ groups $R^2$ are other than a hydrogen atom, each $R^3$ denotes an alkyl group of 1 to 4 carbon atoms, or conjointly each pair represents a group of formula $-CH_2CH_2-$, $-C(R^7R^8)CO-$, $$-CH_2CH-,\atop |\atop CH_3$$

$-CH_2CH_2CH_2-$, $-COCO-$, $-COCOCO-$, or $-COC(OH)_2CO-$, $R^4$ represents a divalent aliphatic, cycloaliphatic, or araliphatic radial of 1 to 8 carbon atoms, especially an alkylene group of 1 to 6 carbon atoms, $b$, $c$, and $d$ are each zero or 1, $R^5$ represents a straight or branched chain aliphatic group of 2 to 20 atoms, such as one of 2 to 9 carbon atoms, especially an alkylene group which may be interrupted by carbonyloxy groups or by ether oxygen atoms, or, providing $c$ is 1, it may alternatively represent a group of formula

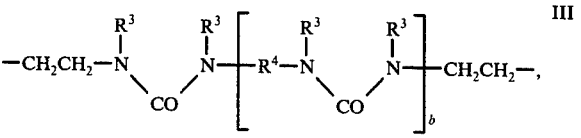

$R^6$ represents a hydrogen atom or an alkyl group of 1 to 4 carbon atoms, and $R^7$ and $R^8$ each represent a hydrogen atom or a methyl or ethyl group.

The preferred epoxide resins of formula I are those wherein $a$ represents an integer of from 5 to 50, those wherein $R^2$ represents an acrylyl, methacrylyl, acrylamidomethyl, or methacrylamidomethyl group, and those wherein both $R^3$ together represent —CH$_2$CH$_2$— or —C(R$^7$R$^8$)CO—.

The resins of formula I may be prepared in two stages.

The first involves reaction of a diepoxide of formula IV

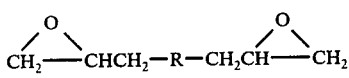

with a diol, dicarboxylic acid, or heterocycle of formula V

to form an advanced, linear diepoxide of formula VI

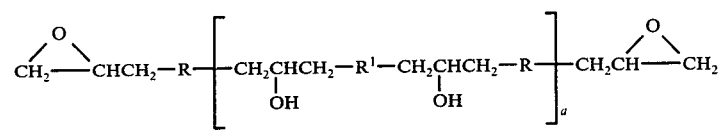

where $1$, R, and $R^1$ are as hereinbefore defined.

Usually, the diepoxide of formula IV is heated with the compound of formula V at a temperature within the range 100°–200° C, and especially at 120°–170° C. The reaction can be accelerated by adding suitable catalysts. Such catalysts are, for example, alkali metal hydroxides such as sodium hydroxide; alkali metal halides such as lithium chloride, potassium chloride, and sodium chloride, bromide, or fluoride; tertiary amines such a triethylamine, tri-n-propylamine, N-benzyldimethylamine, N,N'-dimethylaniline, and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate, and methyltriethylammonium chloride; and hydrazines having a tertiary nitrogen atom, such as 1,1-dimethylhydrazine, which can also be employed in their quaternised form. Depending on the choice of the starting substances, the reaction in some cases takes place quantitatively so rapidly that no addition of catalyst is necessary. Whilst the starting materials are generaly mixed with one another at room temperature and are then brought to the reaction temperature, it is advantageous in the case of very interreactive components if the polyepoxide compound is first heated by itself to the requisite reaction temperature and the other reaction components are then gradually added in small portions. Progress of the reaction up to formation of the end product having a defined epoxide group content which essentially remains constant can be followed by titration of the epoxide groups using samples taken during the reaction.

Such advancement reactions are known (see, e.g., British Patent Specifications Nos. 1230889 and 1237610).

In the second stage, the water-soluble resin of formula I is prepared from the advanced diepoxide VI by replacement of some or all of the indicated secondary hydroxy groups by groups —OR$^2$, where $R^2$ is as hereinbefore defined. Conventional methods of esterification or etherification may be used.

Thus, this replacement may be effected by reaction with an alcohol or acid of formula VII

where $R_1^2$ has the same meanins as $R^2$ (except that it cannot represent a hydrogen atom) or an ester- or ether-forming derivative thereof, such as a metal alcoholate or an acid halide of the acid.

Reaction between the diepoxide of formula VI and the compound of formula VII is generally effected at a temperature of from 60° to 150° C, especially at 100° to 130° C, in the absence of a solvent or in the presence of an inert, polar solvent such as chloroform or N,N-dimethylformamide. When the compound of formula VII is an alcohol, water may be used. Preferably, when an alcohol of formula VII is used, a catalyst such as a mineral or organic acid, e.g., phosphoric, sulphuric, or toluene-p-sulphonic acid is included, and water formed during the reaction may be removed continuously (see, e.g. German Offenlegungsschrift No. 2300542). The molar ratio of the advanced diepoxide of formula VI to the compound of formula VII is preferably such that at least 25%, and especially up to 75%, of the secondary hydroxyl groups are replaced by groups —OR$_1^2$. If desired, an inhibitor of free radicals, such as hydroquinone, may be included in order to lessen the occurrence of side reactions. Such inhibitors need not be removed at the end of the reaction since they maintain the stability of the product but do not prevent its polymerisation on exposure to actinic radiation.

This invention accordingly further provides a method for the preparation of water-soluble, photopolymerisable epoxide resins of formula I comprising reaction of some or all of the indicated secondary hydroxyl groups in an advanced diepoxide of formula VI with an alcohol of formula VII or an ether-forming derivative thereof using etherification methods known per se, or with an acid of formula VII or an ester-forming derivative thereof, using esterification methods known per se.

Development of the irradiated resin is effected, as previously mentioned, by treatment with water, usually at 0° to 40° C, and preferably at 15° to 25° C. Because the solubility in water of some of the resins of formula I decreses with increase in temperature, some irradiated resins need to be developed at below room temperature, especially at near 0° C.

The resins of this invention are particular value in the production of printing plates and printed circuits, especially multilayer printed circuits which can be prepared without removal of the photopolymerised resin. A layer of the resin may be applied to a support by coating the support with a solution of the resin in any convenient solvent, e.g., water, cyclohexanone, or 2-ethoxyethanol, and allowing or causing the solvent to evaporate. Non-aqueous solutions generaly give a smoother coating than aqueous solutions, and so are preferred. The layer may be applied by dipping, whirling or spin-coating (a process in which the material is put on a plate which is then rotated at high speed to distribute the material over the plate), spraying, or by means of a roller.

This invention also includes a plate sensitive to actinic radiation comprising a support, which may be of, for example, paper, copper, aluminium or other metal, synthetic resin, or glass, carrying a layer of a resin of formula I, also a support bearing upon its surface such a resin which has been polymerised by exposure to actinic radiation. It also provides a method of polymerising such a resin which comprises subjectin a plate carrying a layer of the resin to actinic radiation, optionally imagewise as through a negative, and removing the unpolymerised portions, if any, of the resin by dissolving them, preferably in water although an organic solvent such as cyclohexanone may be used if desired.

In polymerizing the resins of this invention, actinic radiation of wavelength 200 to 600 nm is preferably used.

Preferably, the resin is exposed to actinic radiation in the presence of a sensitiser such as a quinone; a diphenylcarbinol; 5-nitroacenaphthene; a diphenylmethane; an α-haloacetophenone such as p-tert.butylphenyl trichloroemthyl ketone; a photoredox catalyst such as a mixture of a phenothiazine dye (e.g., methylene blue) or a substituted quinoxaline with an electron-donating reducing agent such as a sulphinic acid or salt of a sulphinic acid, a phosphine, an arsine, or thiourea; a benzophenone; a benzil dialkyl acetal such as α-methoxybenzoin methyl ether; benzoin; a benzoin alkyl ether; and an O-alkoxycarbonyl derivative of an oxime of benzil or 1-phenylpropane-1, 2-dione, such as benzil-(O-ethoxycarbonyl)-α-monoxime and 1-phenylpropane-1, 2-dione-2-(O-ethoxycarbonyl)oxime. Preferred sensitisers, especially for irradiating through a negative, are Michler's ketone (4,4'-bis(dimethylamino)benzophenone), benzoin n-butyl ether and mixtures of these two; metal salts of 2-(m- or p-methoxyphenyl)quinoxaline-6'-or -7'- sulphonic acids mixed with a metal toluene-p-sulphinate; and 1-phenylpropane-1,2-dione-2-(O-ethoxycarbonyl)oxime. Usually from 0.1 to 20%, and preferably from 0.5 to 15%, by weight of the sensitiser, calculated on the weight of the polymerisable resin, is employed.

The resin should be applied to the support so that, upon drying, its thickness will be in the range of from about 1 to 250 μm. The thickness of the polymerisable layer is a direct function of the thickness desired in the relief image, which will depend on the subject being reproduced and particularly on the extent of the non-printing areas to be etched. The wet polymer coating may be dried by air drying or by any other known drying technique, and the polymerisable system may then be stored until required for use.

The polymerisable coatings can be insolubilised by exposure to actinic radiation through, as already indicated, an image-bearing transparency consisting of substantially opaque and transparent areas. Suitable sources of actinic radiation include carbon arcs, mercury vapour arcs, fluorescent lamps with phosphors emitting ultra-violet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of a resin will depend upon a variety of factors which include for example, the individual resin being utilised, the thickness of the coating, the type of light source, and its distance from the coating.

If appropriate, say, in the production of printed circuits where the support is of copper or of other suitable electrically-conducting metal, the exposed metal is etched in a conventional manner using, for example, ferric chloride or ammonium persulphate solutions.

If desired, the resin may be crosslinked through its epoxide groups after exposure to actinic radiation. Such crosslinking often enhances the adhesion of the polymerised composition to the support. For this purpose conventional curing agents for expoxide resins may be included in the coating solutions. The curing agent selected must not be sensitive to water, nor water-soluble, otherwise is will be affected or removed by the development process. A preferred curing agent is dicyandiamide. To crosslink the composition it is heated after development, generally at a temperature of from 100° to 200° C.

The following Examples illustrate the invention. All temperatures are in degrees Celsius. Epoxide contents were measured by titration against a 0.1N solution of perchloric acid in glacial acetic acid in the presence of excess of tetraethylammonium bromide, crystal violet being used as the indicator.

EXAMPLE 1

A mixture of 1,3-diglycidyl-5,5-dimethylhydantoin of epoxide content 8.12 equiv./kg (150 g), ethylene glycol (37.5 g), and tetramethylammonium chloride (0.1 g) was stirred at 150° for 18 hours and then at 160° for 7 hours, by which time the epoxide content of the product was 0.4 equiv./kg. The resin was cooled and crushed, and to 83 g of this were added N-hydroxymethylacrylamide (50 g; i.e., 85% of the theoretical quantity required to react with all of the secondary hydroxyl groups) and hydroquinone (0.3 g). The mixture was slowly heated to 100° and stirred until a homogeneous mixture was obtained. Orthophosphoric acid (0.1 g) was then added, the temperature was raised to 110°, and the mixture was stirred for 15 minutes. The pressure in the reaction flask was then reduced to 15 mm by means of a water pump, and stirring was continued at 110° for a further 1¾ hours, by which time most of the water formed during the reaction had been removed. The resulting resin (epoxide content, 0.32 equiv./kg) was dissolved in 2-ethoxyethanol to give a 35% solution by weight.

The product is substantially of formula I, where R denotes

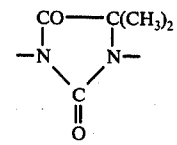

R¹ denotes —OCH$_2$CH$_2$O—, up to 85% of R² groups denote —CH$_2$NH-COCH=CH$_2$ and the remainder —H, and a is an integer of average value 15. Michler's ketone (0.02 g) and n-butyl benzoin ether (0.02 g) were dissolved in 2 g of the resin solution, the composition was coated onto a copper-clad laminate, and the solvent was allowed to evaporate, leaving a film about 10 μm thick.

The film was irradiated for 10 seconds through a negative using a 500 watt medium pressure mercury lamp at a distance of 230 mm. After irradiation, the image was developed by washing with water at 20°, which removed the unexposed areas of the film. Uncoated copper areas were then etched using an aqueous solution of ferric chloride (60% w/v FeCl$_3$) containing concentrated hydrochloric acid (10% v/v), leaving a good relief image.

EXAMPLE 2

5,5-Dimethylhydantion (35 g) was added slowly, over a period of 2 hours, to a mixture of 1,4-butanediol diglycidyl ether of epoxide content 9.19 equiv./kg (20 g) and tetramethylammonium chloride (0.1 g) at 100°. After this addition, the mixture was stirred at 120° for 30 minutes, by which time the epoxide content of the resin was 0.12 equiv./kg. To 15 g of the cooled resin were added N-hydroxymethylacrylamide (8 g; i.e, 85% of the theoretical quantity required to react with all of the secondary hydroxyl groups) and hydroquinone (0.05 g). The mixture was heated slowly to 100°, stirred until a homogeneous solution was obtained, and orthophosphoric acid (0.04 g) was added. The mixture was stirred at 110° for 1¾ hours under reduced pressure, as described in Example 1. The epoxide content of the resulting resin was 0.10 equiv./kg.

It is substantially of formula I, where
R denotes —O(CH$_2$)$_4$O—,
R$^1$ denotes

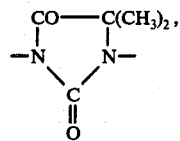

up to 85% of the groups R$^2$ denote —CH$_2$NHCOCH═CH$_2$ and the remainder denote —H, and a denotes an integer of average value 49.

A 35% w/w solution of the product in 2-ethoxyethanol was prepared.

Michler's ketone (0.03 g) and p-tert.butylphenyl trichloromethyl ketone (0.03 g) were dissolved in 2 g of the resin solution and the mixture was tested as described in Example 1. A good relief image was obtained after 30 seconds' exposure and development in water at 20°.

EXAMPLE 3

A mixture of 1,3-diglycidyl-5,5-dimethylhydantoin of epoxide content 8.12 equiv./kg (40 g), 5,5-dimethylhydantoin (18.9 g), tetramethylammonium chloride (0.2 g), hydroquinone (0.2 g), and cyclohexanone (88.1 g) was stirred at reflux for 5 hours, by which time the epoxide content of the product was 0.85 equiv./kg (based on the solids content of the solution). The solvent was removed under reduced pressure and the solid resin was dissolved in chloroform (150 ml).

N-Hydroxymethylacrylamide (15.6g; i.e., 52% of the theoretical quanity required to react with all of the secondary hydroxyl groups) and orthophosphoric acid (0.6 g) were added to the solution and the solution was heated to reflux for 12 hours. Water produced during the condensation was separated from the azeotropic mixture, 2.3 ml being collected (about 85% of theoretical volume). The solution was filtered to remove a small amount of precipitate and the chloroform was removed at reduced pressure. The solid resin (epoxide content 0.70 equiv./kg) was dissolved in 2-ethoxyethanol (80 g).

The product is essentially of formula I, where both R and R$^1$ denote

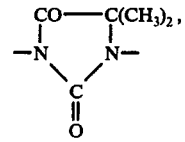

up to 52% but at least 44%, of the groups R$^2$ denote —CH$_2$NHCOCH═CH$_2$ and the remainder —H, and a denotes an integer of average value 6.

Michler's ketone (0.01 g) and benzoin n-butyl ether (0.02 g) were dissolved in 2 g of the solution and the compositon was tested as described in Example 1. A good relief image was obtained after 90 seconds's irradiation and development in water at 20°.

EXAMPLE 4

5,5-Dimethylhydantoin (12.6 g) was added slowly to a stirred mixture of 1,3-diglycidyl-5,5-dimethylhydantoin (90 g), ethylene glycol (14.2 g), and tetramethylammonium chloride (0.2 g) at 120°. After this addition, the mixture was stirred at 155° for 18 hours and at 170° for 5 hours, at which time the epoxide content of the resin was 0.67 equiv./kg. The resin was cooled and crushed, and to 96 g of this resin were added N-hydroxymethylacrylamide (43 g; i.e., 70% of the theoretical quantity required to react with all of the secondary hydroxyl groups) and hydroquinone (0.13 g). The mixture was heated to 100°, and stirred until a homogeneous mixture was obtained. Orthophosphoric acid (0.3 g) was added, and the mixture was stirred at 110° for 1¾ hours under reduced pressure, as described in Example 1. The resultant resin (epoxide content 0.45 equiv./kg) was diluted to 40% w/w with 2-ethoxyethanol.

The product is essentially a mixture of products of formula I, where
R denotes

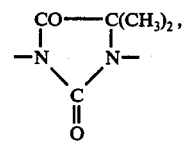

some of the groups R$^1$ are the same as R and the remainder are —O(CH$_2$)$_2$O—, up to 70% of the R$^2$ groups denote —CH$_2$NHCOCH═CH$_2$ and the remainder —H, and a denotes an integer of average value 13.

Sodium 2-(m-methoxyphenyl)quinoxaline-6'- and -7'-sulphonates (0.01 g) and sodium p-toluenesulphinate (0.01 g) were dissolved in 2 g of the resin solution and the mixture was tested as described in Example 1. A good relief image was obtained after 10 seconds' irradiation and development in water at 15°-20°.

EXAMPLE 5

5-Ethyl-5-methylhydantoin (40 g) was added slowly to a stirred mixture of 1,4-butanediol diglycidyl ether of epoxide content 9.19 equiv./kg (60g) and tetramethylammonium chloride (0.8g) at 100°. The mixture was stirred at 120° for 5 hours, by which time the epoxide content was 0.5 equiv./kg. N-Hydroxymethylacrylamide (3.0 g; i.e, 34% of the theoretical quantity required to react with all of the secondary hydroxyl groups) and hydroquinone (0.05 g) were added to 15 g of the cooled, crushed resin, and the mixture was stirred at 100° until a homogeneous mixture was formed. Orthophosphoric acid (0.05 g) was added, and the mixture was stirred at 110° for 1 hour under reduced pressure, as described in Example 1. The epoxide content of the resin was 0.4 equiv./kg.

The product is essentially of formula I, where
R denotes —O(CH$_2$)$_4$O—,
R$^1$ denotes

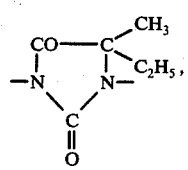

up to 34% of the groups R$^2$ denote —CH$_2$NHCOCH=CH$_2$ and the remainder —H, and up
$a$ denotes an integer of average value 11.

A mixture of Michler's ketone (0.01 g) and benzoin n-butyl ether (0.02 g) was dissolved in 2 g of a 35% w/w solution of the resin in 2-ethoxyethanol. A good relief image was obtained after 60 seconds' irraidation and development in water at 15°.

EXAMPLE 6

A mixture of 20 g of 1,3-diglycidyl-2-imidzolidinone (epoxide content 9.8 equiv./kg), ethylene glycol (5.77 g), and tetramethylammonium chloride (0.10 g) was stirred at 150° for 8 hours, by which time the expoxide content of the product was 0.52 equiv./kg. N-Hydroxymethylacrylamide (6 g; i.e., 50% of the theoretical quantity required to react with all of the secondary hydroxyl groups) and hydroquinone (0.05 g) were added to 15 g of the cooled, crushed resin, and the mixture was stirred at 110° until it was homogeneous. Orthophoshoric acid (0.05 g) was added to the resin, and stirring was continued at 110° for 1 hour under reduced pressure, as described in Example 1. The product was dissolved in 2-ethoxyethanol to give a 35% w/w solution, and the solution was filtered to remove a small amount of precipitated solid. The epoxide content of the resin was 0.43 equiv./kg.

The product is substantially of formula I, where
R represents

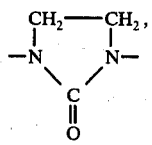

R$^1$ represents —OCH$_2$CH$_2$O—,
up to 50% of the groups R$^2$ denote —CH$_2$NHCOCH=CH$_2$ and the remainder —H, and
$a$ represents an interger of average value 14.

Sodium 2-(m-methoxyphenyl)quinoxaline-6'- and -7'-sulphonates (0.01 g) and sodium p-toluenesulphinate (0.01 g) were dissolved in 2 g of the solution of the product and the composition was tested according to the procedure of Example 1. A good relief image was obtained after 5 seconds' irradiation and development in water at 20°.

EXAMPLE 7

1,4-Butanediol diglycidyl ether of epoxide content 9.19 equiv./kg (20g), ethylene glycol (5.7g), and tetramethylammonium chloride (0.01 g) were stirred at 150° for 9 hours and then at 160° for 4 hours: the epoxide content of the product was 0.34 equiv./kg. N-Hydroxymethylacrylamide (4.5 g; i.e., 40% of the theoretical quantity required to react with all of the secondary hydroxyl groups) and hydroquinone (0.05 g) were added to 15 g of the cooled resin, and the mixture was stirred at 100° until homogeneous. Orthophosphoric acid (0.05 g) was added, the temperature was raised to 110°, and stirring was continued for 1 hour under reduced pressure, as described in Example 1. The epoxide content of the resin was 0.28 equiv./kg.

The product is substantially of formula I, where
R denotes —O(CH$_2$)$_4$O—,
R$^1$ denotes —O(CH$_2$)$_2$O—,
up to 40% of the groups R$^2$ denote —CH$_2$NHCOCH=CH$_2$ and the remainder —H, and
$a$ denotes an integer of average value 21.

Michler's ketone (0.01 g) and benzoin n-butyl ether (0.02 g) were dissolved in 2 g of a 35% w/w solution of the resin in 2-ethoxyethanol and the composition was tested according to the procedure of Example 1. A good relief image was obtained after 60 seconds' irradiation and development in water at 20°.

EXAMPLE 8

A mixture of 1,4-butanediol diglycidyl ether of epoxide content 9.19 equiv./kg (16 g), succinic acid (5.3 g), and tetramethylammonium chlorde (0.1 g) was stirred at 120° for 30 minutes, by whoch time the epoxide content of the product was 2.46 equiv./kg. The product was cooled, N-hydroxymethylacrylacrylamide (5 g) and hydroquinone (0.02 g) were added, and the mixture was heated to 110° and stirred until homogeneous. Orthophosphoric acid (0.05 g) was added and the mixture was stirred at 110° for 1 hour under reduced pressure, as in Example 1.

The product is essentially of formula I, where
R denotes —O(CH$_2$)$_4$O—,
R$^1$ denotes —OOC(CH$_2$)$_2$COO—,
up to 60% of the groups R$^2$ denote —CH$_2$NHCOCH=CH$_2$, and the remainder —H, and
$a$ denotes an interger of average value 2.

Michler's ketone (0.01 g) was benzoin n-butyl ether (0.02 g) were dissolved in 2 g of a 40% w/w solution of the resin in 2-ethoxyethanol, and the composition was tested as described in Example 1. A good relief image was obtained after 50 seconds' irradiation and development in cold (0°) water, the resin being insufficiently soluble to be developed in water at 20°.

EXAMPLE 9

2-Imidazolidinone (8g) was added slowly to a stirred mixture of 1,3-diglycidyl-2-imidazolidinone (20g) and tetramethylammonium chloride (0.1 g) at 100°. After this addition, the mixture was stirred at 120° for 4 hours, by which time the epoxide content of the product was 0.8 equiv./kg. N-Hydroxymethylacrylamide (6.4 g; i.e., 56% of the theoretical quantity required to react with all of the secondary hydroxyl groups) and hydroquinone (0.02 g) were added to 16 g of the cooled, crushed resin, and the mixture was heated to 110° whilst stirring until homogeneous. Orthophosphoric acid (0.05 g) was added, and the mixture was stirred at 110° for 1 hour under reduced pressure, as described in Example 1. The epoxide content of the resin was 0.72 equiv./kg.

The product is substantially of formula I, where both R and R¹ each denote

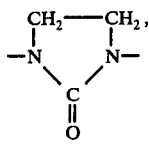

up to 56% of the groups R² denote —CH₂NH-COCH=CH₂, and the rest —H, and $a$ denotes an integer of average value 9.

Michler's ketone (0.01 g) was benzoin n-butyl ether (0.02 g) were dissolved in 2 g of a 35% w/w solution in 2-ethoxyethanol of the resin and the composition was tested according to the procedure of Example 1. A good relief image was obtained after 60 seconds' irradiation and development in water at 20°.

EXAMPLE 10

A resin (10 g), prepared by advancing 1,3-diglycidyl-5,5-dimethylhydantoin with ethylene glycol as described in Example 1, dissolved in dry chloroform (40 ml) was treated with acrylyl chloride (2.4 g; i.e., 45% of the theoretical quantity required to react with all of the secondary hydroxyl groups) and the solution was refluxed for 2 hours. Removal of the solvent under reduced pressure gave a solid resin, which was dissolved in 2-ethoxyethanol to form a 40% w/w solution.

The product is substantially of formula I, where R denotes

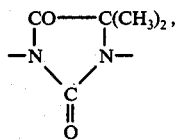

R¹ denotes —OCH₂CH₂O—, up to 45% of the groups R² denote 13 COCH=CH₂ and the remainder —H, and $a$ denotes an integer of average value 15.

Michler's ketone (0.01 g) and benzoin n-butyl ether (0.02 g) were dissolved in 2 g of the resin solution and the composition was tested as described in Example 1. A good relief image was obtained after 20 seconds' irradiation and development in water at 20°.

EXAMPLE 11

To 6 g of a 40% solution in 2-ethoxyethanol of the resin prepared in Example 4 was added a mixture of sodium 2-(m-methoxyphenyl)quinoxaline-6'- and -7'-sulphonates (0.03 g), sodium p-toluenesulphinate (0.03 g), and dicyandiamide (0.13 g). A copper-clad laminate was coated with the composition, the solvent was allowed to evaporate, and the film was irradiated through a negative, as described in Example 1, for 30 seconds. Development in water at 20° gave a good relief image on the copper. The plate was then heated at 170° for 1 hour to cure the resin. The coating had good adhesion to the copper and excellent solvent resistance; thus, it passed the standard acetone-rub test, i.e., twenty rubs with a cotton-wool swab soaked in acetone did not remove any of it. The coating was equally resistant to water.

EXAMPLE 12

A mixture of 1,3-dimethylurea (11 g), 1,3-diglycidyl-5,5-dimethylhydantoin of epoxide content 8.12 equiv./kg (32 g), and tetramethylammonium chloride (0.05 g), was stirred at 120° for 5 hours, by which time the epoxide content of the mixture was 0.9 equiv./kg.

N-Hydroxymethylacrylamide (18 g; i.e., 65% of the theoretical quantity required to react with all of the secondary hydroxyl groups) and hydroquinone (0.1 g) was added to the resin at 100°, and the mixture was stirred to give a homogeneous solution. Orthophosphoric acid (0.1 g) was added, and the mixture was stirred at 105° for 1½ hours under reduced pressure, as described in Example 1.

The product is essentially of formula I, where R denotes

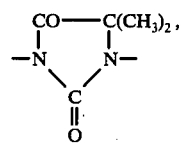

R¹ denotes

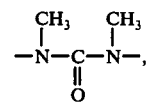

up to 65% of the groups R² denote —CH₂NH-COCH=CH₂ and the remainder —H, and $a$ denotes an integer of average value 5.

A 40% solution of the resin in 2-ethoxyethanol was prepared. A mixture of 2-(m-methoxyphenyl)quinoxaline-6'-and -7'-sulphonates (0.01 g) and sodium p-toluenesulphinate (0.01 g) was dissolved in 2 g of the solution, and the mixture was tested as described in Example 1. A good relief image was obtained after 30 seconds' irradiation and development in water at 20°.

EXAMPLE 13

A mixture of hexahydro-2H-pyrimidin-2-one (10 g), 1,3-diglycidyl-5,5-dimethylhydantoin of epoxide content 8.12 equiv./kg (24.6 g), tetramethylammonium chloride (0.04 g), and 2-ethoxyethanol (52 g) was stirred at 120° for 100 hours, by which time the epoxide content of the product was approximately 0.7 equiv./kg, based on the solids content of the solution. (The epoxide value could not be determined accurately due to interference by the hexahydro-2H-pyrimidin-2-one.) The solvent was removed at reduced pressure and the solid resin was dissolved in chloroform (115 g).

N-hydroxymethylacrylamide (14 g; i.e., 65% of the theoretical quanity required to react with all the secondary hydroxyl groups), hydroquinone (0.1 g), and orthophosphoric acid (0.3 g) were added to the solution, and the resulting solution was refluxed for 25 hours. Water produced during the condensation was separated from the azetropic mixture, 1.8 ml. being collected (75% of theory). The solution was filtered to remove a small amount of precipitate, and the chloroform was removed at reduced pressure.

The product is essentially of formula I, where R denotes

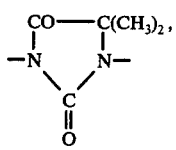

$R^1$ denotes

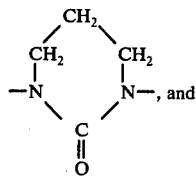

up to 65%, but at least 49%, of the $R^2$ groups denote —$CH_2NHCOCH=CH_2$ and the rest denote —H.

The product was dissolved in 2-ethoxyethanol to give a 40% w/w solution. Michler's ketone (0.01 g) and benzoin-n-butyl ether (0.03 g) were dissolved in 2 g of the solution and the composition was tested according to Example 1. A relief image was obtained after 2 minutes' irradiation and development in water at 20°.

EXAMPLE 14

A mixture of alloxan monohydrate (8.0 g), 1,4-butanediol diglycidyl ether of epoxide content 9.19 equiv./kg (10.8 g), tetramethylammonium chloride (0.02 g), and 2-ethoxyethanol (25 g) was stirred at 120° for 54 hours, by which time the residual epoxide content of the product was 0.52 equiv./kg (based on the solids content of the solution). The solvent was removed under reduced pressure and the resin was dissolved in chloroform (60 g).

N-Hydroxymethylacrylamide (6.5 g; i.e., 65% of the theoretical quanity required to react with all the secondary hydroxyl groups), hydroquinone (0.1 g), and orthophosphoric acid (0.2 g) were added to the solution, and the resulting solution was refluxed for 20 hours.

Water produced during the condensation was separated from the azetropic mixture, 0.8 ml being collected (73% of theory). The solution was filtered to remove a small amount of precipitate, and the chloroform was removed under reduced pressure.

The product is essentially of formula I, where R denotes —O—$(CH_2)_4$—O—, $R^1$ denotes

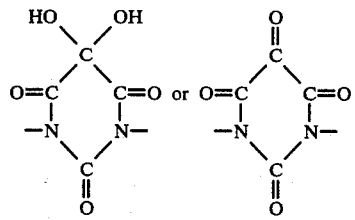

up to 65%, but at least 47%, of the groups $R^2$ denote —$CH_2NHCOCH=CH_2$, and the rest —H, and $a$ denotes an integer of average value 12.

The product was dissolved in 2-ethoxyethanol to give a 40% w/w solution, Michler's ketone (0.01 g) and benzoin n-butyl ether (0.03 g) were dissolved in 2 g of the solution, and the composition was tested according to the procedure of Example 1. A relief image was obtained after 2 minutes' irradiation and development in water.

EXAMPLE 15

A mixture of 4-methyl-2-imidazolidinone (7 g), 1,4-butanediol diglycidyl ether of epoxide content 8.32 equiv./kg (16.8 g), tetramethylammonium chloride (0.02 g), and 2-ethoxyethanol (36 g) was stirred at 120° for 100 hours, by which time the epoxide content was 1.12 equiv./kg. The solvent was removed under reduced pressure.

To 16 g of the resin was added a 60% aqueous solution of N-hydroxymethylacrylamide (10 g; i.e., about 70% of the amount needed to react with all the secondary hydroxy groups) and hydroquinone (0.01 g). The mixture was heated to 100° and stirred until homogeneous, orthophosphoric acid (0.2 g) was added, and the whole was stirred at 105° for 2 hours.

The product is essentialy of formula I, where R denotes —$O(CH_2)_4O$—, $R^1$ denotes

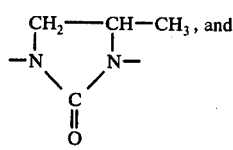

up to 70% of the $R^2$ groups denote —$CH_2NH$-$COCH=CH_2$ and the rest denote —H.

The resin was diluted with an equal weight of 2-ethoxyethanol. To 2 g of the solution were added Michler's ketone (0.01 g) and benzoin n-butyl ether (0.03 g), and the composition was tested as described in Example 1. A relief was obtained after 2 minutes' irradiation and development in water at 20°.

EXAMPLE 16

To 20 g of the advanced resin prepared in Example 4 was added hydroquinone (0.02 g) and a 60% aqueous solution of N-hydroxymethylacrylamide (14.6 g, i.e., 65% of the theoretical quantity required to react with all the secondary hydroxy groups). The mixture was heated to 100°, stirred until homogeneous, and orthophosphoric acid (0.2 g) was added. The solution was stirred at 105° for 2 hours.

The resin solution was diluted with an equal weight of 2-ethoxyethanol. 1-Phenyl-1,2-propanedione-2-(O-ethoxycarbonyl) oxime (0.03 g) was dissolved in 2 g of the solution, and the composition was tested as described in Example 1. A good relief image was obtained after 15 seconds' irradiation and development in water at 20°.

EXAMPLE 17

A mixture of 1,1'-methylenebis(5,5-dimethylhydantoin) (13.4 g), 1,4-butanediol diglycidyl ether of epoxide content 9.19 equiv./kg (11.5 g), and tetramethylammonium chloride (0.02 g) was heated with stirring to 100°, whereupon a rapid reaction occurred, with the temperature rising to 150+. The mixture was quickly cooled to 120°, and heating at 120° was continued for 30 minutes, by which time the epoxide content was 0.18 equiv./kg. The resin was cooled to 100°, and a mixture of N-hydroxymethylacrylamide (6.5 g; i.e., 65% of the theoretical quantity required to react with all the secondary hydroxyl groups) and hydroquinone (0.02 g) was added. The mixture was stirred at 100° to effect solution, orthophosphoric acid (0.2 g) was added, and the whole was stirred at 110° for 1 hour under reduced pressure as described in Example 1.

The product is essentially that of formula I, where R denotes —O(CH$_2$)$_4$O—,

R$^1$ denotes

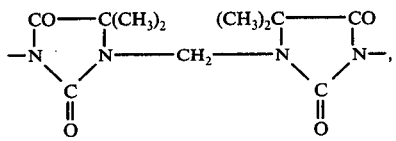

up to 65% of the groups R$^2$ denote —CH$_2$NH-COCH=CH$_2$ and the remainder —H, and a denotes an integer of average value 24.

The product was dissolved in 2-ethoxyethanol to give a 50% w/w solution. 1-Phenyl-1,2-propanedione-2-(O-ethoxycarbonyl) oxime (0.03 g) was dissolved in 2 of the solution, and the composition was tested as described in Example 1. A good relief image was obtained after 30 seconds' irradiation and development in water at 20°.

EXAMPLE 18

A mixture of 1,3-diglycidyl-5,5-dimethylhydantoin of epoxide content 8.12 equiv./kg (13.0 g., triethylene glycol (7.5 g), and tetramethylammonium chloride (0.02 g) was stirred at 180° for 14 hours, by which time the epoxide content of the product was 0.42 equiv./kg. The resin was cooled to 100°, and N-hydroxymethylacrylamide (6.7 g; i.e., 65% of the theoretical quantity required to react with all the secondary hydroxyl groups) and hydroquinone 0.02 g) were added. The resulting mixture was stirred at 105° to form a solution, and orthophosphoric acid (0.2 g) was added. Stirring was continued at 105° for 15 minutes at atmospheric pressure and then for 1 hour under reduced pressure as described in Example 1. The resulting resin was dissolved in 2-ethoxyethanol to give a 50% solution by weight.

The product is substantially of formula I, where R denotes

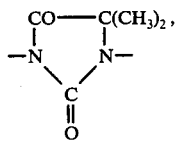

R$^1$ denotes —OCH$_2$CH$_2$OCH$_2$CH$_2$OCH$_2$CH$_2$O—, up to 65% of the R$^2$ groups denote —CH$_2$NH-COCH=CH$_2$ and the remainder —H, and a is an integer of average value 12.

1-Phenyl-1,2-propanedione-2(O-ethoxycarbonyl) oxime (0.03 g) was dissolved in 2 g of the product solution, and the composition was tested as described in Example 1. A good relief image was obtained after 30 seconds' irradiation and development in water at 20°.

We claim:

1. Epoxide resins of the formula

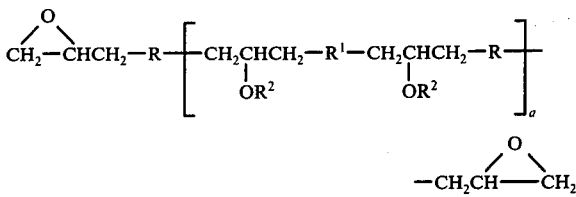

where a is an integer of average value of at least 1 and at most 100, each R and R$^1$ represents a group of formula

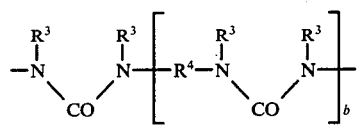

or —O—(OC)$_c$—R$^5$—(CO)$_c$—O—, each R$^2$ represents a hydrogen atom or a group of formula —(CH$_2$NH)$_d$COC(R$^6$)=CH$_2$, with the proviso that at least 1 of the 2a groups R$^2$ represents —(CH$_2$NH)$_d$COC(R$^6$)=CH$_2$, each R$^3$ denotes an alkyl group of 1 to 4 carbon atoms, or conjointly each pair represents a group of formula —CH$_2$CH$_2$—, —C(R$^7$R$^8$)CO—,

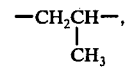

—CH$_2$CH$_2$CH$_2$—, —COCO—, —COCOCO—, or —COC(OH)$_2$CO—,

R$^4$ represents a divalent aliphatic, cycloaliphatic, or araliphatic radical of 1 to 8 carbon atoms, b, c, and d are each zero or 1, R$^5$ represents a straight or branched chain aliphatic group of 2 to 20 atoms or, providing c is 1, it may alternatively represent a group of formula

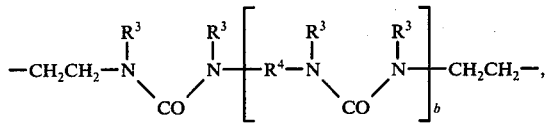

R$^6$ represents a hydrogen atom or an alkyl group of 1 to 4 carbon atoms, and

R$^7$ and R$^8$ each represent a hydrogen atom or a methyl or ethyl group.

2. An epoxide resin accordinng to claim 1, in which at least 25% of the 2a groups R$^2$ represent —(CH$_2$NH)$_d$CO(R$^6$)=CH$_2$.

3. An epoxide resin according to claim 1, in which R$^2$ represents an acrylyl, methacrylyl, acrylamidomethyl, or methacrylamidomethyl group.

4. An epoxide resin according to claim 1, in which R$^4$ represents an alkylene group of 1 to 6 carbon atoms.

5. An epoxide resin according to claim 1, in which R$^5$ represents an alkylene hydrocarbon group, an alkylene group interrupted by at least one carbonyloxy group, or an alkylene group interrupted by at least one ether oxygen atom.

6. An epoxide resin according to claim 1, in the form of a layer on a support, comprising a plate sensitive to actinic radiation.

7. An epoxide resin according to claim 6, mixed with an effective amount of a curing agent for epoxide resins.

* * * * *